July 14, 1953
F. P. LACKINGER
2,645,314
APPARATUS FOR BLEEDING AIR AND REPLACING
LIQUID IN HYDRAULIC BRAKE SYSTEMS
Filed Oct. 9, 1951
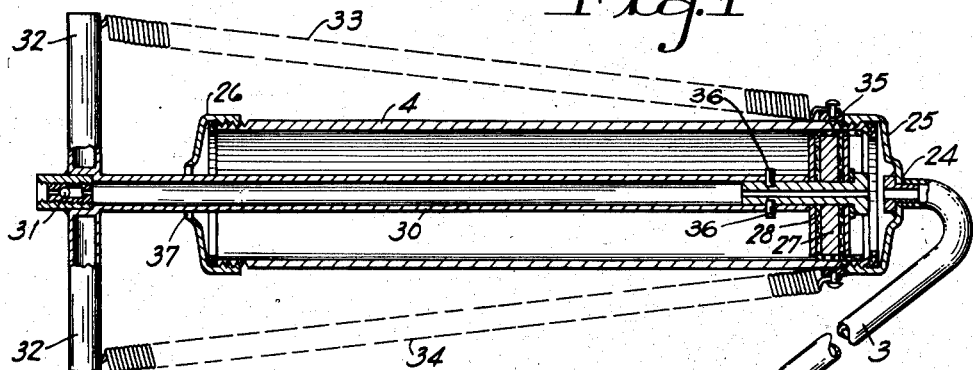
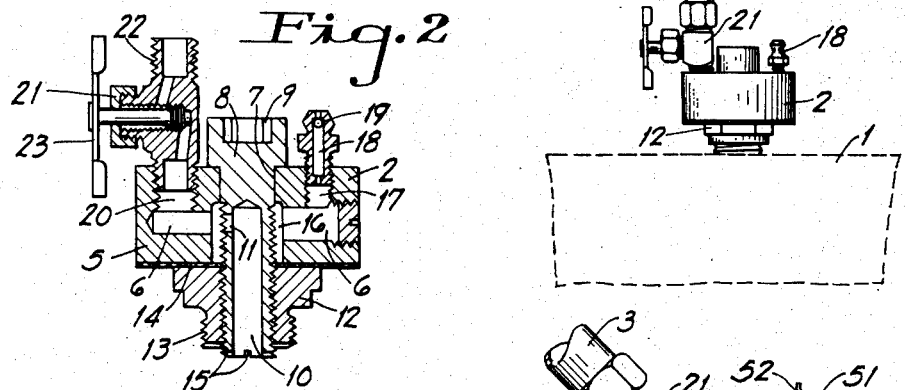
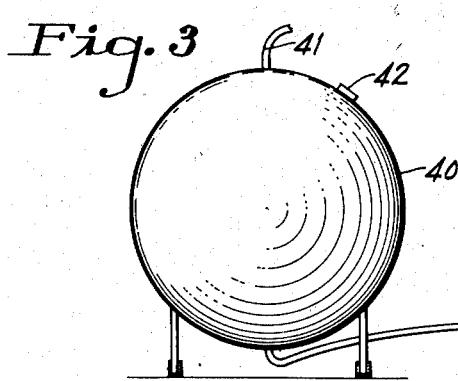
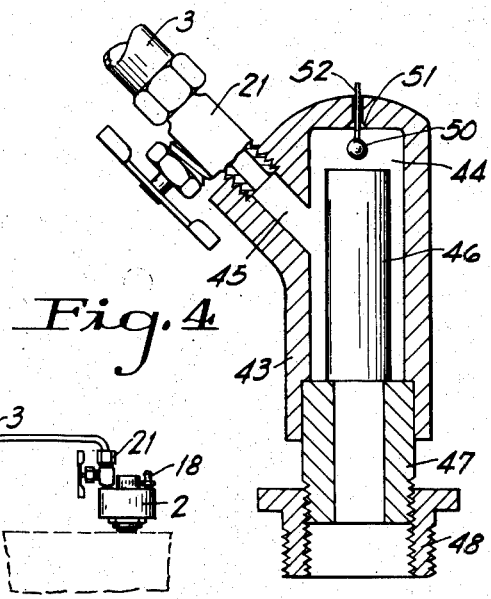
INVENTOR.
FRANK P. LACKINGER
BY
William D Carothers
HIS ATTORNEY.

Patented July 14, 1953

2,645,314

UNITED STATES PATENT OFFICE 2,645,314

APPARATUS FOR BLEEDING AIR AND REPLACING LIQUID IN HYDRAULIC BRAKE SYSTEMS

Frank P. Lackinger, McKees Rocks, Pa.

Application October 9, 1951, Serial No. 250,450

8 Claims. (Cl. 188—152)

This invention relates generally to apparatus for replacing liquid in a hydraulic braking system of vehicles and more particularly to apparatus for simultaneously bleeding air from the hydraulic braking system while supplying it with hydraulic liquid.

In apparatus employed today for the filling of hydraulic brake systems of vehicles there is no provision to exhaust or otherwise deplete the air in the system and there is no assurance of getting the air out of the master cylinder or the braking system. If the air in the master cylinder works its way into the pressure chamber containing the filling liquid it can be trapped and again pumped back into the hydraulic braking system. An attempt is made to bleed the air off the system by opening the small cocks adjacent the brake drums located at each wheel. This is usually unsuccessful.

The object of the present invention is to provide apparatus that will permit one to fill a master cylinder with a braking liquid and at the same time bleed off all of the air in the system. Ordinarily the master cylinder in an automobile is not the highest point of the braking system and any air that leaks into the system and any part thereof will eventually find its way to the highest point. This master cylinder ordinarily has a screw plug at the upper end thereof, and if one were to remove the plug and pour the liquid from an open container, the air can escape from the master cylinder. However, it is impractical to do this owing to the location of the master cylinder or its plug. Again the brake pedal cannot be oscillated to work the air out of the system when the master cylinder is open. Thus, it is desirable to remove the plug and replace it by a connector to which a hose may be attached for the purpose of bleeding the air and supplying liquid to the master cylinder and be able to oscillate the brake pedal to work all of the air out of the system at the bleeding points.

Another object is the construction of this connector together with the applicating means which comprise an important feature of this invention.

Other objects and advantages appear hereinafter in the following description and claims.

The accompanying drawings show for the purpose of exemplification without limiting the invention or claims thereto, certain practical embodiments of the invention wherein:

Fig. 1 is a view partly in section and partly in elevation showing an apparatus for filling a hydraulic brake system.

Fig. 2 is a sectional view of the adapter employed to connect the liquid containing pressure chamber to the master cylinder of the braking system.

Fig. 3 shows another type of pressure chamber employed for supplying liquid to the hydraulic braking system of an automobile.

Fig. 4 is a modified form of the connection which may be attached to the master cylinder of a hydraulic braking system for the purpose of bleeding air simultaneously of the supply of liquid thereto.

Referring principally to Fig. 1 of the drawings, the master cylinder of the hydraulic braking system is indicated at 1. An air manifold member 2 is connected to the master cylinder and in turn is connected by the hose 3 to the pressure chamber 4 that contains a hydraulic liquid.

The liquid air manifold as shown in detail in Fig. 2 comprises the body member 5 having the transverse passage 6 and the vertical passage 7. The vertical passage is closed by the bolt 8 having a valve and socket 9 at the top thereof and the lower end of the bolt is hollow as indicated at 10 and is provided with a lateral opening 11 which communicates with the transverse passage 6. The bolt 8 is threadably engaged into the internal thread of the plug 12 which in turn is provided with the thread 13 to permit the member 2 to be secured in sealed relation to the master cylinder 1. Thus, the plug 12 can be inserted in the master cylinder 1 and the member 2 with the bolt 8 projecting therebelow may be threadably secured in the bore of the plug 12 to tighten the member 2 in place. A sealing washer such as indicated at 14 may be provided to prevent the escape of liquid or air by reason of the connection. The upper end of the bolt 8 fits tightly against the upper surface of the body member 5 so as to prevent any leakage.

The hollow bolt 8 is provided with lateral slots as indicated at 15 at the lower end thereof to permit the air to find its way into the bore 10 where it may be discharged through the lateral port 11 into the annular chamber 16. The air then may travel through the lateral passage 6 to the vertical passage 17 and thence out the bore of the check valve 18.

The check valve 18 is provided with the ball check as indicated at 19 and will permit the air to escape up around it and through the bore. However, if the master cylinder becomes filled with liquid, then the liquid starts to build up a pressure causing it to flow vertically up through the passageway 17 to the check valve 18. The liquid will cause the ball check to seat at the top of the valve as indicated in Fig. 2 and prevent the escape of liquid from the system.

The opposite end of the transverse passage 6 connects with the vertical passage 20 which has attached thereto the valve member 21, the upper end of which is threaded as indicated at 22 to receive one end of the hose 3. The valve 21 is operated by the handle 23 which, when turned in, causes the passage to be closed between the hose 3 and the transverse slot 6 and thus retain the liquid in the hose.

The liquid cylinder 4 is a hollow sleeve having end caps 25 and 26 mounted thereon. The cap 25 has the hose 3 attached thereto as indicated at 24. A piston 27 has two flexible cup members 28 clamped therein for the purpose of sealing and forcing the liquid through the hose 3. The piston is connected to the hollow rod 30 which has a check valve 31 at its outer end. The check valve permits any air in the cylinder to escape past the check valve 31. After the air escapes liquid fills the hollow piston rod 30 at which time it closes the valve 31. Thus air in this pressure chamber may escape so that it will not be forced into the master cylinder of the hydraulic braking system.

The outer end of the piston rod 30 is provided with a handle 32 which extends outwardly on both sides of the rod and has connected thereto a pair of springs 33 and 34 which in turn are connected to a ring 35 attached to the opposite end of the cylinder 4. When the valve member 21 is detached from the member 2 it may be opened for inserting the oil or liquid into the pressure cylinder 4 by pulling back on the handle 32 and withdrawing the pistons to the left in Fig. 1 until the pins 36 slip through aligned slots in the opening 37. In this manner the pressure chamber can be filled or one of the caps 25 or 26 may be removed to fill the chamber. When the piston is completely retracted to fill the cylinder 4, the piston rod may be rotated to permit the pins 36 to be out of alignment with the slots 37 and thus lock the piston open.

After filling the pressure chamber with liquid the valve 21 may be inserted into the member 2 and the apparatus is ready for service. When it is desired to apply liquid to the master cylinder 1 of a braking system, the piston rod 30 is turned slightly to permit the pins 36 to be released through the slots 37 and pressure is applied by the springs 33 and 34 on the liquid. Any air within the brake system will be bled out through the check valve 31 and the liquid will then close the same.

When the member 2 is secured to the master cylinder of the braking system the valve 21 is then opened, the springs force the piston to move inwardly putting pressure on the liquid in the cylinder 4 causing it to flow into the master cylinder 1. At the same time any air will escape. However, the air in place of going up the passage 20 will travel laterally to the passage 17 and out of the check valve 18 until all of the air has escaped from the system and the liquid then seeking this path of least resistance will close the check valve. The liquid will not attempt to close the valve 19 until after all the air is exhausted from the master cylinder.

In the structure as shown in Fig. 3 a fluid ball chamber 40 is employed in place of the pressure cylinder 4 and is provided with a hose 41 for connecting the ball to air under pressure which is ordinarily found in a garage. The ball 40 may be opened by the cap 42 and substantially filled with liquid. Thus, in place of using the springs 33 and 34 to exert the pressure on the system the ball 40 employs air under pressure.

Referring now to Fig. 4 the air divider has been modified as indicated at 43 which is a hollow body having a Y-connection providing the passages 44 and 45. The passage 44 is preferably larger in diameter than the passage 45 and contains the float 46.

The lower end of the passage 44 is provided with a thread adapter plug as indicated at 47, which is designed to fit the smallest threaded opening of the master cylinders in automobiles. If a master cylinder is provided with a larger threaded opening the adapter 48 may be applied to the plug 47. Thus any number of adapters may be provided to fit any size of threaded opening in the master cylinder of the braking systems. The adapter plug 47 is connected with the manifold 43 by a press fit as shown and maintains the float 46 in the bore 44.

The upper end of the passage 44 has a check valve member 50 which will normally stay open but can engage with the seat 51 when raised by the float 46. The valve 50 has the valve stem 52 that extends above the manifold. This valve, like the ball check valve 19, will permit the air to escape upwardly from the master cylinder, but when all the air has been emitted from the system the liquid filling the system rises in the bore 44 and lifts the float 46. The float 46 rises and presses the valve 50 upwardly closing it on the seat 52 and, thus, not allowing the same to discharge any liquid.

This divider member 43 may readily be applied to the master cylinder of any braking system by hand and need not require a wrench which is usually employed in adapting the plug 12 of Fig. 2 to the master cylinder. Again a structure of this character is very easily made as a die casting which simplifies the structure over that shown in Figs. 1 and 2.

I claim:

1. An apparatus for simultaneously bleeding air from and inserting liquid into the master cylinder of a hydraulic brake system which comprises, a pressure chamber to contain a liquid for use in a hydraulic brake system, manifold means adapted to connect and seal said pressure chamber to a master cylinder to permit the inflow of liquid while bleeding air from the hydraulic brake system, and an air bleeding liquid pressure closing check valve in said means to permit the escape of air from a master cylinder while the liquid is entering the same.

2. The structure of claim 1 which also includes a valve to close the pressure chamber from said manifold means.

3. The structure of claim 1 characterized in that said pressure chamber comprises a liquid chamber with a spring-biased piston for exerting the pressure thereon.

4. The structure of claim 3 which also includes a second air bleeding liquid pressure closing check valve mounted on said pressure chamber to permit the escape of air from said pressure chamber when the spring-biased piston exerts pressure on the liquid in the chamber.

5. The structure of claim 1 characterized in that said pressure chamber comprises a liquid chamber with an air pressure connection thereto for applying pressure on said liquid.

6. An apparatus for simultaneously bleeding air from and inserting liquid into the master cylinder of a hydraulic brake system which comprises, a pressure chamber containing a liquid for use in a hydraulic braking system, a liquid-air manifold adapted to connect and seal said pressure chamber with the master cylinder to permit the inflow of liquid while bleeding air from the braking system, and an air bleeding liquid pressure closing check valve in said manifold to permit the escape of air from the master cylinder while the liquid is entering the same.

7. A liquid-air manifold for use in simultaneously bleeding air from and supplying liquid to a hydraulic brake system comprising, a ported member adapted to be connected in sealed relation to the hydraulic braking system, means in said ported member defining two passages open to said hydraulic brake system, means to conduct liquid under pressure through one of said passages to the hydraulic brake system, and an air bleeding liquid pressure closing check valve in the other passage to permit the air to escape and to prevent the liquid from escaping from said member.

8. A liquid-air manifold for use in simultaneously bleeding air from and supplying liquid to a hydraulic brake system comprising, a ported member adapted to be connected in sealed relation to the hydraulic braking system, means in said ported member defining two passages open to said hydraulic brake system, means to conduct liquid under pressure through one of said passages to the hydraulic brake system, an air bleeding liquid pressure closing check valve in the other passage to permit the air to escape from the liquid supply and the braking system while filling the latter, and a float in said member to engage and close said valve when liquid rises therein to prevent the liquid from escaping from said member.

FRANK P. LACKINGER.

References Cited in the file of this patent

UNITED STATES PATENTS

| Number | Name | Date |
| --- | --- | --- |
| 2,181,073 | Schaeffer et al. | Nov. 21, 1939 |